United States Patent
Gondoh

(10) Patent No.: US 12,176,566 B2
(45) Date of Patent: Dec. 24, 2024

(54) BATTERY MODULE

(71) Applicant: Panasonic Intellectual Property Management Co., Ltd., Osaka (JP)

(72) Inventor: Hiroaki Gondoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 947 days.

(21) Appl. No.: 17/266,162

(22) PCT Filed: Jun. 18, 2019

(86) PCT No.: PCT/JP2019/024055
§ 371 (c)(1),
(2) Date: Feb. 5, 2021

(87) PCT Pub. No.: WO2020/039722
PCT Pub. Date: Feb. 27, 2020

(65) Prior Publication Data
US 2021/0313650 A1 Oct. 7, 2021

(30) Foreign Application Priority Data
Aug. 23, 2018 (JP) .................. 2018-156603

(51) Int. Cl.
*H01M 50/30* (2021.01)
*H01M 10/6562* (2014.01)
(Continued)

(52) U.S. Cl.
CPC ....... *H01M 50/30* (2021.01); *H01M 10/6562* (2015.04); *H01M 50/204* (2021.01); *H01M 50/207* (2021.01)

(58) Field of Classification Search
CPC .... H01M 50/30; H01M 50/35; H01M 50/204; H01M 50/207; H01M 10/6562; Y02E 60/10
See application file for complete search history.

(56) References Cited

U.S. PATENT DOCUMENTS

2009/0197153 A1 8/2009 Fujikawa et al.
2012/0164490 A1 6/2012 Itoi et al.
(Continued)

FOREIGN PATENT DOCUMENTS

CN 102473884 A 5/2012
CN 103474599 A 12/2013
(Continued)

OTHER PUBLICATIONS

Bagaria et al., Effect of dust dispersion on particle breakage and size distribution in the minimum ignition energy apparatus, Available online Jul. 4, 2017, Journal of Loss Prevention in the Process Industries, 56, (2018), 518-523 (Year: 2018).*
(Continued)

*Primary Examiner* — Haroon S. Sheikh
*Assistant Examiner* — Kan Luo
(74) *Attorney, Agent, or Firm* — Rimon P.C.

(57) ABSTRACT

A battery module as an example of an exemplary embodiment includes a cooling path for cooling and guiding a gas ejected from an exhaust valve to an outside of the battery module. The cooling path is formed such that temperature T (° C.) of the gas at a path outlet is lower than or equal to 500° C. The cooling path is provided with at least one of a filter having opening size A (mm) of smaller than or equal to 3.5 mm or a baffle plate having opening size A (mm) equivalent to smaller than or equal to 3.5 mm for limiting a size of an ejected object included in the gas when temperature T is higher than or equal to 350° C.

6 Claims, 4 Drawing Sheets

(51) Int. Cl.
*H01M 50/204* (2021.01)
*H01M 50/207* (2021.01)

(56) References Cited

U.S. PATENT DOCUMENTS

| | | |
|---|---|---|
| 2014/0113167 A1 | 4/2014 | Itoi et al. |
| 2015/0079426 A1 | 3/2015 | Chen et al. |
| 2015/0140369 A1 | 5/2015 | Itoi et al. |
| 2017/0084894 A1* | 3/2017 | Freiman et al. ........ H01M 2/12 |

FOREIGN PATENT DOCUMENTS

| | | |
|---|---|---|
| JP | 2009-212081 | 9/2009 |
| JP | 2011-065906 | 3/2011 |

OTHER PUBLICATIONS

International Search Report of PCT application No. PCT/JP2019/024055 dated Sep. 24, 2019.
English Translation of Chinese Office Action dated Sep. 28, 2022 for the related Chinese Patent Application No. 201980052801.3.

* cited by examiner (a)

(b)

BATTERY MODULE

CROSS-REFERENCE TO RELATED APPLICATIONS

This application is a U.S. national stage application of the PCT International Application No. PCT/JP2019/024055 filed on Jun. 18, 2019, which claims the benefit of foreign priority of Japanese patent application No. 2018-156603 filed on Aug. 23, 2018, the contents all of which are incorporated herein by reference.

TECHNICAL FIELD

The present disclosure relates to a battery module.

BACKGROUND ART

In general, batteries configuring a battery module are provided with exhaust valves that operate when an internal pressure rises in order to prevent outer cans from bursting when an abnormality such as an internal short circuit occurs and the internal pressure rises. Further, the battery module is provided with an exhaust structure for discharging a high-temperature gas ejected from the exhaust valves of the batteries to an outside of the battery module. PTL 1 discloses a battery module in which a vent hole formed in a side surface of a module case is covered with a metal mesh member. PTL 1 describes that heat of a flame is absorbed by the mesh member and the flame can be prevented from being emitted from the module case.

CITATION LIST

Patent Literature

PTL 1: Unexamined Japanese Patent Publication No. 2009-212081

SUMMARY OF THE INVENTION

When an ejected object such as an electrode material is discharged from the battery module together with high-temperature gas, the ejected object may become a fire source and cause ignition. The battery module is therefore provided with various safety measures to prevent such ignition. In recent years, as energy density of batteries has increased, an amount of heat generated when an abnormality occurs tends to increase, and there has been a growing demand for safety improvement.

A battery module according to one aspect of the present disclosure is a battery module including a plurality of batteries each provided with an exhaust valve, and includes a cooling path cooling and guiding a gas ejected from the exhaust valve to an outside of the battery module. The cooling path is formed such that temperature T (° C.) of the gas at a path outlet is lower than or equal to 500° C. The cooling path is provided with at least one of a filter having opening size A (mm) of smaller than or equal to 3.5 mm or a baffle plate having opening size A (mm) equivalent to smaller than or equal to 3.5 mm for limiting a size of an ejected object included in the gas when temperature T is higher than or equal to 350° C.

The cooling path is preferably formed based on a condition of formula 1.

$$T \leq 350 - \{\mathrm{Ln}(A/3.5)\}/0.008 \qquad \text{Formula 1}$$

In a battery module according to another aspect of the present disclosure, the cooling path is formed based on a condition of formula 2 such that temperature T of the gas at the path outlet is lower than or equal to 500° C., and diameter B of the ejected object in the gas discharged from the outlet is smaller than or equal to 3.5 mm.

$$B \leq 3.5 e^{\{0.008(350-T)\}} \qquad \text{Formula 2}$$

The battery module of the present disclosure can further improve safety.

DESCRIPTION OF EMBODIMENT

In recent years, secondary batteries such as lithium-ion batteries have been used as power sources for driving electric vehicles (EVs) and hybrid electric vehicles (HEVs, PHEVs), and there has been more demand for improvement in volumetric energy density of batteries than ever before. Further, as energy density of batteries has increased, an amount of heat generated when an abnormality occurs tends to increase, and there has been a growing demand for safety improvement in battery modules.

The inventors have found that by constructing a cooling path based on the condition of formula 1, a possibility of ignition is greatly reduced even when an abnormality occurs in the battery and an ejected object such as an electrode material is discharged from the battery module together with a high-temperature (lower than or equal to 500° C.) gas. That is, by applying the cooling path to the battery module, the safety of the battery module can be further improved.

Hereinafter, an example of an exemplary embodiment of a battery module of the present disclosure will be described in detail with reference to the drawings. The present exemplary embodiment exemplifies, as a battery configuring the battery module, battery 11 which is a square battery provided with a square metal case configured by an outer can and a sealing plate, but the battery is not limited to this battery.

Figure 1A:
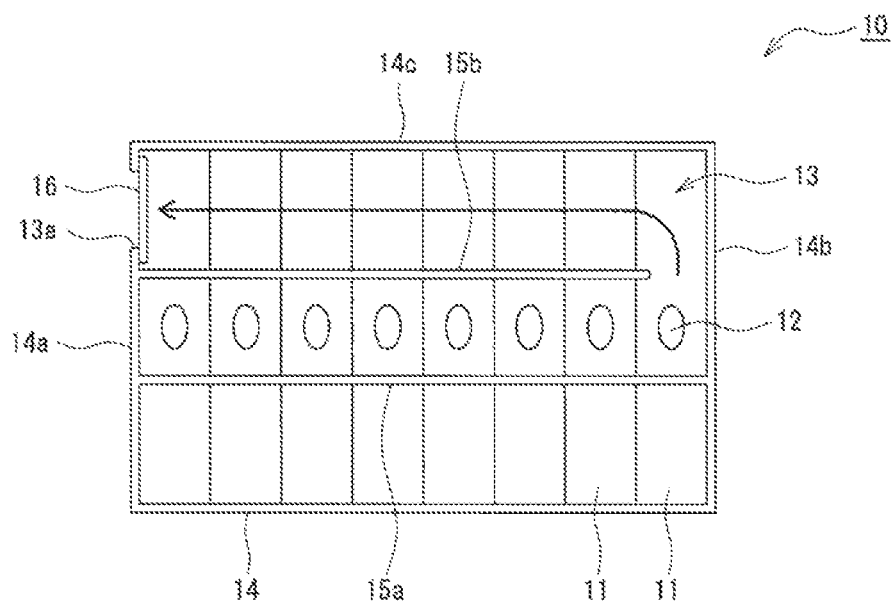
FIG. 1A is a plan view schematically showing a battery module as an example of an exemplary embodiment.
Figure 1B:
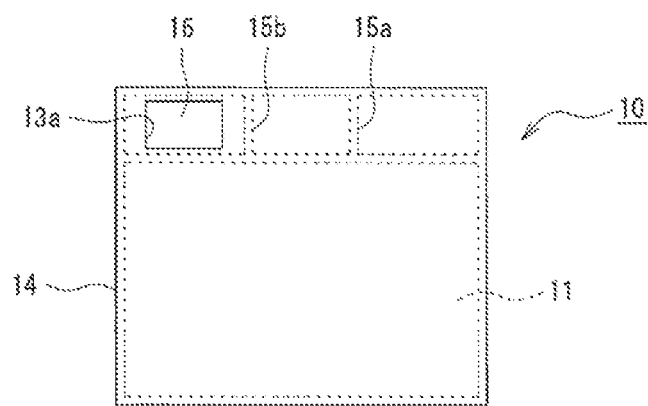
FIG. 1B is a front view schematically showing the battery module as an example of the exemplary embodiment.

FIGS. 1A and 1B are a plan view and a front view schematically showing battery module 10 as an example of the exemplary embodiment, respectively. FIG. 1A shows a state in which a top plate of module case 14 is removed. Battery module 10 includes a plurality of batteries 11 each provided with exhaust valve 12. Further, battery module 10 includes cooling path 13 for cooling and guiding a gas ejected from exhaust valve 12 to the outside of the battery module. As will be described in detail later, cooling path 13 is formed such that temperature T (° C.) of an exhaust gas at outlet 13a of the path is lower than or equal to 500° C. Further, in cooling path 13, a filter is installed to limit a size of the ejected object included in the exhaust gas when temperature T of the exhaust gas at outlet 13a is higher than or equal to 350° C. Opening size (a diameter of the inscribed circle of the opening) A (mm) of the filter is smaller than or equal to 3.5 mm, and cooling path 13 is formed based on the condition of the following formula 1.

$$T \leq 350 - \{\mathrm{Ln}(A/3.5)\}/0.008 \qquad \text{Formula 1}$$

Battery module 10 includes module case 14 that houses a plurality of batteries 11. Module case 14 is, for example, a substantially rectangular parallelepiped case, and cooling path 13 is formed inside module case 14. The plurality of batteries 11 is aligned in a longitudinal direction of module case 14 and is disposed in the case in a state where exhaust valves 12 face an identical direction (vertically upward). A spacer may be provided between adjacent batteries 11. In the example shown in FIG. 1A, exhaust valves 12 of the plurality of batteries 11 are aligned in a row along the longitudinal direction of module case 14.

Battery module 10 may include a pair of end plates that sandwiches a battery assembly including the plurality of batteries 11 from both sides in a stacking direction of batteries 11, and a binding bar that is attached over the end plates and binds the plurality of batteries 11. Alternatively, the plurality of batteries 11 may be bound by housing the plurality of batteries 11 in module case 14. In general, the plurality of batteries 11 is electrically connected by a bus bar. Batteries 11 may be connected in series or in parallel, and may be disposed such that positive and negative terminals of adjacent batteries 11 are located opposite to each other.

Module case 14 may include metal or resin, but a cooling function of cooling path 13 is generally improved when a metal case is used as compared with when a resin case is used. Module case 14, including metal such as aluminum or an aluminum alloy, can, for example, shorten a path length required to keep the temperature of the gas at outlet 13a of cooling path 13 at lower than or equal to 500° C.

Battery 11 includes, for example, a battery case configured by a bottomed square tubular outer can and a sealing plate that closes an opening of the outer can. As described above, the battery case is a square metal case, and battery 11 is a square battery. The battery case houses an electrode body and an electrolyte inside. The electrode body has a structure in which a pair of electrodes (positive electrode and negative electrode) including a metal core body and a mixture layer formed on a surface of the core body is stacked via a separator. The solid ejected object ejected from exhaust valve 12 of battery 11 when an abnormality occurs is, for example, a constituent material of the electrode body. The electrolyte may be either an aqueous electrolyte or a non-aqueous electrolyte, and may be either a liquid electrolyte or a solid electrolyte. An example of battery 11 is a non-aqueous electrolyte secondary battery such as a lithium ion battery, a nickel-hydrogen battery, or a nickel-cadmium battery.

The outer can of battery 11 has, for example, a flat shape that is long in a lateral direction of module case 14. The outer can generally includes a metal material, and a resin film may be attached to an outer surface of the outer can in order to ensure insulation. The sealing plate is a member for closing the opening of the outer can and sealing an internal space of the battery case, and has a substantially rectangular shape that is long in the lateral direction of module case 14. The sealing plate may be provided with a positive electrode terminal and a negative electrode terminal. In this case, through-holes are formed at both ends in a longitudinal direction of the sealing plate, and each terminal is attached to each through-hole via an insulating gasket.

Exhaust valve 12 is provided, for example, at a center of the sealing plate in the longitudinal direction. Exhaust valve 12 is a part surrounded by an annular groove. The part where the groove is formed is thinner than the other parts, and breaks preferentially over the other parts when an abnormality occurs in battery 11 and an internal pressure rises. Then, the gas is discharged from exhaust valve 12 to prevent the outer can from bursting. Although FIG. 1A illustrates exhaust valve 12 having an elliptical shape in a plan view, the shape of exhaust valve 12 is not particularly limited and may be a perfect circle shape, a semicircular shape, or the like.

As described above, cooling path 13 is a path for cooling and guiding the gas ejected from exhaust valve 12 to the outside of battery module 10. Cooling path 13 is also called an exhaust duct. Cooling path 13 is formed, for example, by providing partition plates 15a, 15b that define the path inside module case 14. In the present exemplary embodiment, cooling path 13 is formed above the sealing plate of each battery 11 provided with exhaust valve 12 inside module case 14. Module case 14 is formed with an opening that serves as outlet 13a of cooling path 13 for discharging the gas ejected from exhaust valve 12 to the outside of the case. In the example shown in FIGS. 1A and 1B, outlet 13a is formed on side wall 14a at one end in the longitudinal direction of module case 14.

Cooling path 13 lowers temperature T of the exhaust gas ejected from outlet 13a to at least 500° C. This is because when temperature T exceeds 500° C., the possibility of ignition increases even without any large ejected object in the gas. The temperature of the exhaust gas that decreases by the exhaust gas passing through cooling path 13 depends on, for example, a length of cooling path 13 (path length) and thermal conductivity of members configuring the path (module case 14, partition plates 15a, 15b, and the like). In general, the longer the path length, the easier it is for temperature T of the exhaust gas at outlet 13a to decrease. However, the longer path length may cause a problem such as an increase in a size of battery module 10, and it is therefore important to design an efficient path in sufficient consideration of safety.

In the examples shown in FIGS. 1A and 1B, partition plates 15a, 15b are provided along the longitudinal direction of module case 14 in which exhaust valves 12 are aligned in a space located above the sealing plates of batteries 11. Partition plates 15a, 15b are disposed in parallel with each other so as to sandwich a row of exhaust valves 12 from both sides. Partition plate 15a is formed along the row of exhaust valves 12 from side wall 14a at one end in the longitudinal direction of module case 14 to side wall 14b at the other end in the longitudinal direction. The opening serving as outlet 13a of cooling path 13 is formed at one end of side wall 14a in a lateral direction. Partition plate 15b is formed from side wall 14a to near side wall 14b along the row of exhaust valves 12. That is, there is a gap between a tip of partition plate 15b and side wall 14b.

Cooling path 13 is formed in a substantially U shape by partition plates 15a, 15b. Cooling path 13 has an upstream part formed between partition plates 15a, 15b, is folded back near side wall 14b on the opposite side of side wall 14a provided with outlet 13a, and has a downstream part formed between partition plate 15b and side wall 14c at one end of module case 14 in the lateral direction. Cooling path 13 is an exhaust duct that is separated by, for example, side walls 14a, 14b, 14c of module case 14 and partition plates 15a, 15b, with a lower part of the path closed by batteries 11, and an upper part of the path closed by the top plate of module case 14 (not shown).

The cooling path may be any path as long as the cooling path can cool the gas until the gas is discharged from the path outlet, and an arrangement, shape, and the like of the cooling path are not limited. For example, the cooling path may be formed below or at a side of a group of batteries inside the module case. Further, an exhaust duct may be attached to the module case, and this exhaust duct may be used as the cooling path.

As described above, cooling path 13 is formed such that temperature T (° C.) of the exhaust gas at outlet 13a is lower than or equal to 500° C. When temperature T falls below 350° C., the filter limiting the size of the ejected object included in the exhaust gas does not have to be installed in cooling path 13, or the filter may be installed. In the present exemplary embodiment, filter 16 having opening size A (mm) of 3.5 mm or less is installed at outlet 13a, and cooling path 13 is formed based on the condition of the following formula 1.

$$T \leq 350 - \{Ln(A/3.5)\}/0.008 \quad \text{Formula 1}$$

The inventors have obtained formula 1 from an experiment with reference to a conventionally proposed "prediction formula of a minimum ignition energy of a flammable gas at an arbitrary temperature ($W_2 = W_1 \exp\{0.008(T_1-T_2)\}$, where $W_1$ is minimum ignition energy at temperature $T_1$ and $W_2$ is minimum ignition energy at temperature $T_2$". A filter configured by a plurality of grid-like openings (mesh, see FIG. 3(a)) is installed at the outlet of the cooling path, and the experiment to obtain formula 1 has been conducted repeatedly while the opening size (a diameter of the inscribed circle of each opening) is changed.

Figure 2:
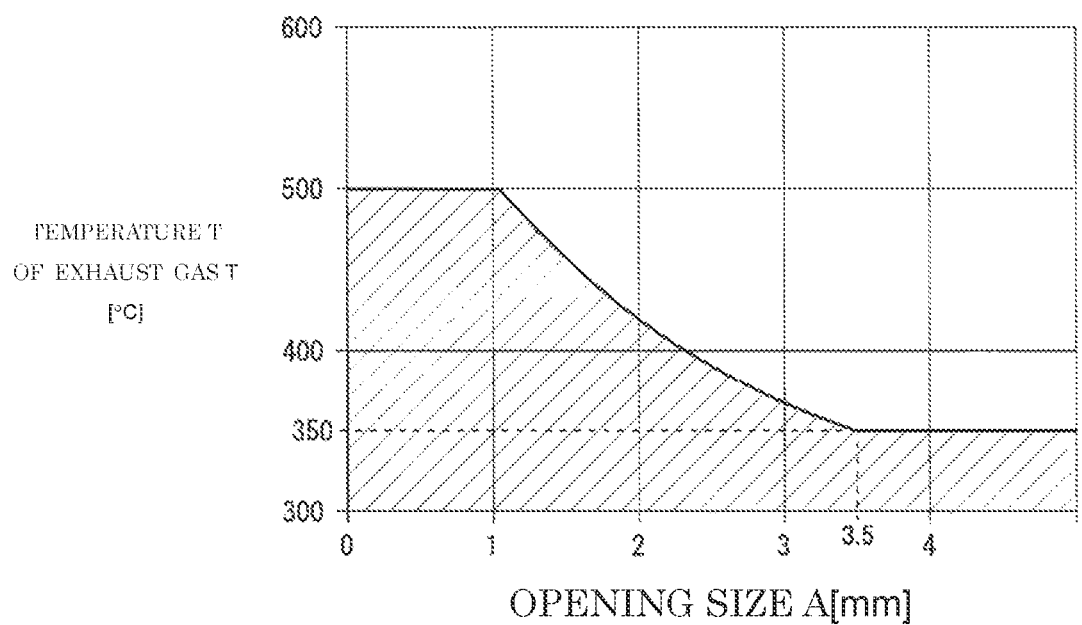
FIG. 2 is a diagram showing a relationship between an opening size of a filter and a temperature of an exhaust gas in the battery module as an example of the exemplary embodiment.

FIG. 2 is a diagram showing a relationship between opening size (the diameter of the inscribed circle of each opening) A of the filter limiting the size of the solid ejected object discharged from outlet 13a of cooling path 13 and temperature T of the exhaust gas. Opening size A of the filter is a diameter (minor diameter) when each opening is a circle, opening size A of the filter is the diameter of the inscribed circle when each opening is rectangular, and opening size A of the filter is a size of a mesh opening when the filter is a mesh. A solid line shown in FIG. 2 shows a threshold value of ignition of exhaust gas including an ejected object, and a curved part of this solid line is represented by formula 1 ($T=350-\{Ln(A/3.5)\}/0.008$). When opening size A of filter 16 and the temperature of the exhaust gas exceed the threshold value (solid line), there is a high possibility that ignition will occur outside battery module 10. As shown in FIG. 2, in order to prevent ignition, it is necessary to reduce the size of the ejected object as the temperature of the exhaust gas at outlet 13a increases. On the other hand, when the size of the ejected object is large, it is necessary to lower the temperature of the exhaust gas by extending cooling path 13, for example.

Cooling path 13 is formed such that opening size A of filter 16 and temperature T of the exhaust gas fall within a hatched range in FIG. 2. As shown in FIG. 2, when the temperature of the exhaust gas is lower than or equal to 350° C., ignition does not occur even without a filter (or a baffle plate described later) that limits the size of the ejected object. However, in order to keep the temperature of the exhaust gas lower than or equal to 350° C., a significantly long cooling path is required, for example. Therefore, when it is not possible to secure a cooling path having a path length required to keep temperature T of the exhaust gas lower than or equal to 350° C., cooling path 13 is preferably formed such that at least a large ejected object is caught by a filter (opening size A≤3.5 mm), and temperature T of the exhaust gas is set to be lower than or equal to 500° C.

In the examples shown in FIGS. 1A and 1B, battery 11 disposed closer to side wall 14a of module case 14 and battery 11 disposed closer to side wall 14b have greatly different distances along cooling path 13 from exhaust valve 12 to outlet 13a. When the plurality of batteries 11 is disposed along cooling path 13, the path length of cooling path 13 is to be set based on battery 11 that has the shortest distance from exhaust valve 12 to outlet 13a along the path. That is, the length of cooling path 13 and the like are determined such that the high-temperature gas ejected from exhaust valve 12 of battery 11 disposed closest to side wall 14b becomes lower than or equal to 500° C. at outlet 13a and the condition of formula 1 is satisfied.

Filter 16 can also be installed in a middle of cooling path 13. In the present exemplary embodiment, filter 16 is installed on an inner surface of side wall 14a of module case 14 so as to entirely cover outlet 13a. That is, filter 16 is disposed inside cooling path 13 at outlet 13a. Filter 16 is larger than, for example, an opening area of outlet 13a, and an end of filter 16 is fixed to a peripheral edge of outlet 13a. Filter 16 may include resin, but preferably includes metal in consideration of heat resistance, strength, and the like.

As illustrated in FIG. 3(a), filter 16 may be a grid-like member that has a plurality of openings 17 having a square shape. Filter 16 shown in FIG. 3(a) is, for example, a mesh (wire mesh) configured by knitting a large number of metal wires. Alternatively, as illustrated in FIG. 3(b), filter 16 may be a plate-shaped member in which the plurality of openings 17 having a circular shape is formed. Filter 16 shown in FIG. 3(b) is, for example, a punching metal in which a plurality of through-holes is formed in a metal plate. The shape, arrangement, and the like of openings 17 of filter 16 are not limited. Filter 16 may be a porous material configured by metal, ceramics, glass, non-woven fabric, or the like.

Filter 16 has a function of capturing the ejected object and, for example, lowering the temperature of the exhaust gas and preventing a flame from being emitted from outlet 13a when battery module 10 ignites. An opening ratio (opening area) and thickness of filter 16 are not limited. The shape and specifications (opening ratio, thickness, and the like) of filter 16 are determined in consideration of air permeability, strength, heat resistance, and the like.

Diameter A of each opening 17 (inscribed circle α) of filter 16 is set to be smaller than or equal to 3.5 mm and satisfy the condition of formula 1. As shown in FIG. 3(b), when each opening 17 is a perfect circle, the diameter of each opening 17 is diameter A. By using filter 16 in which diameter A of each opening 17 (inscribed circle α) satisfies the condition of formula 1, ignition is prevented when the high-temperature exhaust gas is discharged to the outside of battery module 10.

Diameter A of each opening 17 (inscribed circle α) is, for example, from 0.05 mm to 3.5 mm, inclusive. As temperature T of the exhaust gas at outlet 13a of cooling path 13 becomes higher, it is necessary to reduce diameter A and the size of the ejected object discharged from outlet 13a. For example, when the length of cooling path 13 is difficult to extend and the temperature of the exhaust gas is difficult to decrease, filter 16 having small openings 17 is used.

By the way, setting opening size A of the filter is considered to be equivalent to limiting the size (diameter B) of the ejected object discharged from outlet 13a of cooling path 13. Conditions for preventing ignition outside battery module 10 can be set by a relationship between diameter B of the ejected object and temperature T of the exhaust gas, and cooling path 13 is formed such that diameter B and temperature T fall within the hatched range shown in FIG. 2. The solid line shown in FIG. 2 indicates the threshold value of ignition of the exhaust gas including the ejected object, and thus size B (diameter B) of the ejected object can be represented by the following formula 2.

$$B \leq 3.5e^{\{0.008(350-T)\}} \quad \text{Formula 2}$$

By limiting size B of the ejected object discharged from outlet 13a of cooling path 13 based on formula 2, ignition outside battery module 10 is prevented when temperature T of the exhaust gas at outlet 13a is from 350° C. to 500° C., inclusive. That is, cooling path 13 is formed such that a large ejected object having diameter B exceeding at least 3.5 mm is caught and temperature T of the exhaust gas is lower than or equal to 500° C.

The actual ejected object is not spherical, size B (diameter B) of the ejected object refers to the diameter of the ejected object assuming that the ejected object is spherical. FIG. 2, which is a base of formula 2, is based on the opening size of the filter, and the ejected object is of course not limited to a spherical shape. However, there is no problem in setting a configuration of cooling path 13 by size B of the ejected object in terms of an amount of energy possessed by the ejected object.

Figure 4:
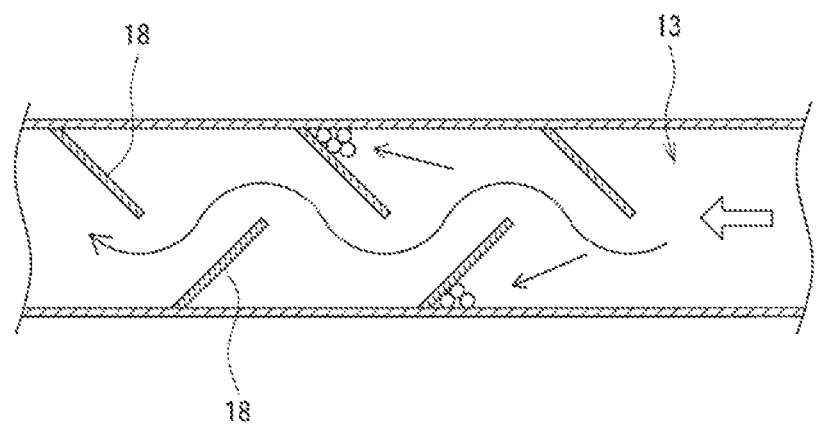
FIG. 4 is a diagram showing a modified example of a cooling path.

As illustrated in FIG. 4, baffle plate 18 that captures the ejected object may be installed in cooling path 13. Baffle plate 18 may be installed instead of filter 16 or may be installed together with filter 16. At least one of filter 16 or baffle plate 18 capturing an ejected object is installed in cooling path 13. For example, a plurality of baffle plates 18 may be installed in the middle of cooling path 13, and filter 16 may be installed at outlet 13a of cooling path 13.

In the example shown in FIG. 4, the plurality of baffle plates 18 extends from opposing side walls of cooling path 13. Tips of baffle plates 18 are located, for example, in a center of cooling path 13 in a width. An angle formed by each of baffle plates 18 and each side wall is an acute angle with respect to an upstream of cooling path 13, and is, for example, from 30° to 70°, inclusive. Baffle plates 18 extending from one side wall and baffle plates 18 extending from the other side wall are alternately disposed along cooling path 13, thereby forming meandering cooling path 13. In this case, when the exhaust gas meanders and flows through cooling path 13, ejected objects included in the gas are captured by baffle plates 18.

Figure 3:
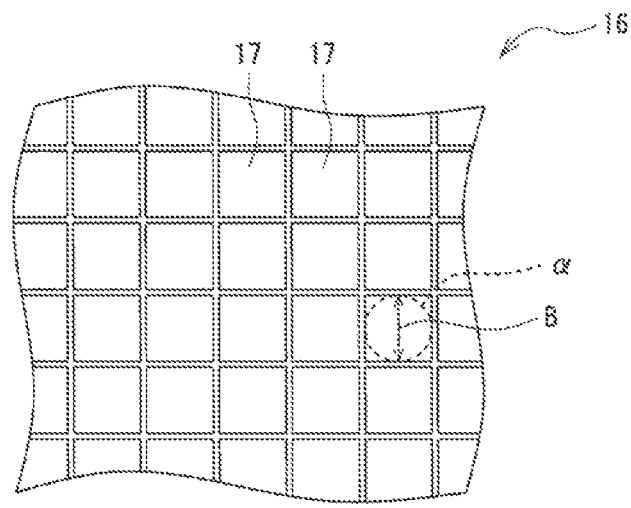
FIG. 3 is a diagram schematically showing the filter as an example of the exemplary embodiment.
Figure 3:
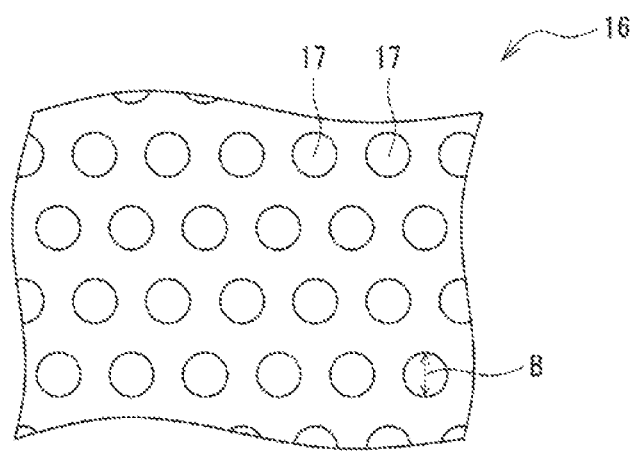

That is, in cooling path 13 illustrated in FIG. 4, baffle plates 18 play a role of filter 16 shown in FIG. 3. Cooling path 13 provided with baffle plates 18 has a function of capturing a large ejected object limited by opening size A (=3.5 mm or less) of the filter and a function of setting temperature T of the exhaust gas at the path outlet to lower than or equal to 500° C. by the path length and a path cross-section of cooling path 13, and an installation position, a number of installations, a shape, and the like of baffle plates 18.

As described above, battery module 10 includes cooling path 13 that is provided with at least one of filter 16 or baffle plate 18 capturing ejected objects and that satisfies the conditions of formula 1 and the like. Battery module 10 can greatly reduce a possibility of ignition and further improve safety of the module when an abnormality occurs in batteries 11 and an ejected object such as an electrode material is emitted from the module together with a high-temperature (lower than or equal to 500° C.) gas.

REFERENCE MARKS IN THE DRAWINGS

10: battery module
11: battery
12: exhaust valve
13: cooling path
13a: outlet
14: module case
14a, 14b, 14c: side wall
15a, 15b: partition plate
16: filter
17: opening
18: baffle plate

The invention claimed is:

1. A battery module comprising:
a plurality of batteries each including an exhaust valve; and
a cooling path configured to cool and guide a gas ejected from the exhaust valve to an outside of the battery module, wherein:
the cooling path is configured to set a temperature T (° C.) of the gas at an outlet of the cooling path to lower than or equal to 500° C.,
the cooling path includes at least one of a filter or a baffle plate,
the filter has an opening size A (mm) of smaller than or equal to 3.5 mm or the baffle plate has the opening size A (mm) equivalent to smaller than or equal to 3.5 mm,
the at least one of the filter or the baffle plate limits a size of an ejected object included in the gas when the temperature T is higher than or equal to 350° C., and
the cooling path is formed based on a condition of a formula 1:

$$T \leq 350 - \{\text{Ln}(A/3.5)\}/0.008.$$

2. The battery module according to claim 1, wherein the filter includes a mesh, a punching metal, or a porous member.

3. The battery module according to claim 1, wherein
the filter has a plurality of openings, and
each of the plurality of openings has an inscribed circle having a diameter that is equivalent to the opening size A and is from 0.05 mm to 3.5 mm, inclusive.

4. The battery module according to claim 1, wherein
The cooling path comprises a U-shape formed by partition plates.

5. A battery module comprising:
a plurality of batteries each including an exhaust valve; and
a cooling path configured to cool and guide a gas ejected from the exhaust valve to an outside of a module,
wherein the cooling path is configured such that a temperature T of the gas at an outlet of the cooling path is lower than or equal to 500° C. and a diameter B of an ejected object in the gas discharged from the outlet is smaller than or equal to 3.5 mm based on a condition of a formula 2:

$$B \leq 3.5e^{\{0.008(350-T)\}}.$$

6. The battery module according to claim 5, wherein
The cooling path comprises a U-shape formed by partition plates.

* * * * *